Patented Mar. 21, 1950

2,501,099

UNITED STATES PATENT OFFICE 2,501,099

ANTHRAPYRIDONE DYESTUFFS

George W. Seymour and Victor S. Salvin, Cumberland, and Wilford Donald Jones, Cresaptown, Md., assignors to Celanese Corporation of America, a corporation of Delaware No Drawing. Application June 19, 1945,
Serial No. 600,402

2 Claims. (Cl. 260—278)

This invention relates to certain anthrapyridone dyestuffs and relates more particularly to the preparation of anthrapyridone dyestuffs which may be employed for dyeing cellulose acetate and other organic derivatives of cellulose in valuable red and red-violet shades.

An object of this invention is the production of novel anthrapyridone dyestuffs capable of dyeing cellulose acetate and other organic derivative of cellulose materials rapidly in red and red-violet shades of superior resistance to light and acid fading.

Another object of this invention is the preparation of anthrapyridone dyestuffs which may be employed for the dyeing of cellulose acetate or other organic derivative of cellulose materials by solvent dyeing processes.

Yet another object of this invention is to provide an improved process for the production of intermediates employed in the formation of said novel anthrapyridone dyestuffs.

Other objects of this invention will appear from the following detailed description.

Certain valuable anthrapyridone dyestuffs have been obtained by the condensation of 1-amino - 2 - sulfo - 4 - arylamino - anthraquinones with ethyl-aceto-acetate in the presence of an alkaline agent. The dyestuffs obtained are acid dyes capable of dyeing wool in red and red-violet shades from an acid bath. When employed for the dyeing of cellulose acetate or other organic derivative of cellulose materials the dyestuffs are found to possess good affinity for said materials. However, the cellulose acetate or other organic derivative of cellulose materials when dyed with said dyestuffs are found to possess poor light fastness and fade badly on exposure to light containing rays in the ultra-violet portion of the spectrum.

We have now found that anthrapyridone dyes of the following general formula:

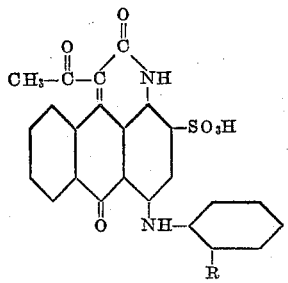

wherein R is an alkyl group, which dyes are prepared by condensing the corresponding 1-amino-2-sulfo-4-(ortho-alkyl)-aryl amino-anthraquinone with ethyl-aceto-acetate, are not only excellent dyestuffs for dyeing cellulose acetate or other organic derivative of cellulose materials by solvent dyeing methods but are, in addition extremely fast to light. The ortho-substitution by the alkyl group, which group may be, for example, a methyl, ethyl, propyl, butyl, isobutyl, amyl, decyl or dodecyl group, appears to have a surprisingly beneficial effect on the light fastness properties of the dyestuffs and renders said dyestuffs far more resistant to light than the corresponding isomeric dyestuffs containing a meta- or para-substituted alkyl group in the aryl nucleus.

The novel dyestuffs of our invention may be prepared by condensing from 5 to 50 parts by weight of ethyl-aceto-acetate with 5 parts by weight of the sodium salt of 1-amino-2-sulfo-4-(ortho-alkyl)-aryl-amino-anthraquinone in the presence of an alkaline agent such as sodium or potassium hydroxide or sodium or potassium carbonate. Most preferably, we employ sodium acetate in an amount of from 0.25 to 0.50 part by weight in effecting the condensation.

The condensation reaction is initiated by raising the reactants to the boiling point under reflux. The reflux temperature is adjusted when reaction commences to allow any lower boiling reaction products such as acetone and ethyl acetate to come over, the higher boiling reactants being returned. The reaction mixture may be placed under a slight vacuum to aid in removing the lower boiling reaction products. After the lower boiling reaction products distill over, the temperature is then raised and the reaction is continued at a temperature of at least 165 to 170° C. under reflux. Any alcohol, acetone or ethyl acetate which is formed is removed. As the condensation proceeds, the reaction mixture turns red and the red shade deepens as reaction proceeds. At the completion of reaction as indicated by the development of the maximum red or red-violet color the reaction mixture is cooled, diluted with a suitable diluent, such as benzene, for example, in which the desired dyestuff is insoluble and the diluted mixture is heated under reflux to dissolve unreacted ethyl-aceto-acetate as well as other benzene-soluble by-products of the reaction. The insoluble dyestuff may then be filtered from the supernatant liquid, washed with benzene and dried. The dyestuffs of our invention have excellent solubility in water, alcohol, acetone and in low molecular weight esters such as ethyl acetate, and exhibit outstanding light fastness when employed for dyeing cellulose acetate or other organic derivative of cellulose materials.

The anthraquinone intermediates employed in the condensation with ethyl-aceto-acetate to form the anthrapyridone structure, namely, the 1-amino-2-sulfo-4-(ortho-alkyl)-aryl-amino anthraquinones may be prepared by reacting 1-amino-2-sulfo-4-brom-anthraquinone with the desired ortho-alkyl-substituted aryl amine in aqueous solution. The usual catalyst employed in such reactions, e. g. copper acetate, has been found to be quite unsatisfactory in promoting this amination reaction when the aryl-amine contains an alkyl group and especially an alkyl group ortho to the amino group. Thus, when copper acetate is employed as the catalyst during amination employing an alkyl-substituted aryl-amine, it has substantially no effect on the speed of reaction and, furthermore, tends to promote hydrolysis of the 4-brom-substituent with the result that a hydroxy group is formed in the 4-position with substantially no replacement of the bromine atom by the alkyl-substituted aryl amino group taking place.

We have found that the most satisfactory results are obtained by employing a catalyst comprising a mixture of finely-divided copper and cuprous oxide. With this particular mixture as catalyst the amination reaction proceeds smoothly with the alkyl-substituted aryl amine replacing the bromine atom in practically theoretical amount and the desired intermediate is obtained in excellent yield and purity.

The amination reaction is preferably effected at a temperature of 70 to 80° C. employing 25 parts by weight of the sodium salt of 1-amino-2-sulfo-4-brom-anthraquinone compound, 7 to 30 parts by weight of the ortho-alkyl aryl amine, and 2000 to 3000 parts by weight of water containing 0.10 to 0.50 part by weight of the copper-cuprous oxide catalyst. An alkaline agent such as sodium bicarbonate is also preferably present. Reaction may be completed in from 1 to 4 hours. The desired 4-(orthoalkyl)-arylamino-anthraquinone intermediate crystallizes out on cooling. The crystallization may be aided by the addition of 30 to 150 parts by weight of sodium chloride thereto, and the intermediate may then be filtered from the supernatant liquid and purified further by recrystallization from water.

The copper-cuprous oxide catalyst is prepared most conveniently by subjecting copper acetate to the reducing action of glucose and sodium hydroxide in aqueous ammoniacal solution. Copper acetate is dissolved in water near the boiling point and aqueous ammonia and glucose are then added. Any suitable insoluble and inert material, such as charcoal, which may act as a carrier and upon which the catalyst is to be supported may be placed in the solution. A dilute solution of sodium hydroxide is then added slowly while the solution is at the boiling point. The catalyst comprising approximately equal parts by weight of copper and cuprous oxide precipitates from solution. The solution is then filtered, the catalyst being deposited on the supporting or carrier material. After washing with hot water the catalyst may be used immediately or stored. However, the catalyst is preferably employed in freshly prepared condition.

In order further to illustrate our invention but without being limited thereto the following examples are given:

Example I 25 parts by weight of the sodium salt of 1-amino-2-sulfo-4-brom-anthraquinone are dissolved in 3,000 parts of water at 70° C. with stirring. 25 parts of ortho-toluidine and 12.5 parts of sodium bicarbonate are then added and 0.3 part by weight of catalyst, comprising a mixture of copper and cuprous oxide, prepared as described below, is then stirred in. The reactants are heated at 70 to 80° C. with agitation for about 1 hour when a pronounced blue color develops. 60 parts by weight of sodium chloride are added to the hot solution and the latter is allowed to cool for 8 hours. A large crop of needle-shaped crystals comprising the crude sodium salt of 1-amino-4-(ortho-toluidino)-anthraquinone-2-sulfonate separate. The crystals are filtered and may be purified further by dissolving in a large quantity of boiling water, filtering the solution obtained and salting the intermediate from the hot solution by the addition of 2% by weight of sodium chloride. The blue, needle-shaped crystals obtained are filtered, washed with 0.5% sodium chloride solution, dried and ground to pass a 40 mesh screen.

The finely-divided copper-cuprous oxide catalyst employed is prepared by first dissolving 10 parts by weight of copper acetate in 1,000 parts by weight of water heated to 90° C. The solution is stirred thoroughly while adding 100 parts by weight of aqueous ammonia, 15 parts of glucose and 10 parts of charcoal thereto. While the resulting solution is heated to the boiling point, 10 parts of sodium hydroxide in 100 parts of water are added dropwise thereto. When the addition of the sodium hydroxide is complete, heating and stirring are continued for 1 hour to complete the reduction. The catalyst formed, comprising finely-divided copper and cuprous oxide in approximately equal amount deposited on a charcoal base, is then filtered, washed three times with hot water and then dried on a suction filter to a slight dampness. The catalyst is then ready for use in the form in which it is obtained.

Example II 5 parts by weight of the purified, dried 40 mesh powder of the sodium salt of 1-amino-4-(ortho-toluidino)-anthraquinone-2-sulfonate, prepared as in Example I, together with 40 parts by weight of ethyl-aceto-acetate and 0.5 part of anhydrous sodium acetate are placed in a vessel equipped with a thermometer and a distilling head. The temperature of the reaction mixture is raised to 130° over the course of ½ hour. The reaction mixture is placed under a sub-atmospheric pressure of 500 mms. of mercury and 3 parts by weight of a distillate comprising ethyl-aceto-acetate, acetone and ethyl acetate is taken off. The vacuum is then broken and the reaction is then allowed to continue at atmospheric pressure. Heating is continued to 165° C. when a noticeable reddening begins. The reaction is continued at 170° C. under reflux for 1½ to 2 hours. At intervals, 1 to 2 parts by weight of a distillate are removed under a sub-atmospheric pressure of 500 mms. of mercury, the distillate comprising any alcohol, acetone or ethyl acetate which forms. When a maximum red color is developed, usually in 3 to 5 hours, heat is discontinued and the charge is cooled to 70° C. At this point 100 parts by weight of benzene are added and the reaction mixture again heated under reflux for 30 minutes to dissolve any unreacted ethyl-acetoacetate and any other benzene-soluble by-products of the reaction. The desired dyestuff is insoluble in benzene. The liquid is poured off and the product obtained is added to 50 parts by weight of benzene and the pot is washed twice with 25 parts by weight of benzene. A violet crystalline powder separates out and is filtered off and washed three times employing 10 parts by weight of benzene for each washing. The product, comprising Bz-1-acetyl-4-(ortho-toluidino)-1-9-anthrapyridone-2-sulfonic acid is obtained, in the form of the sodium salt, in a yield of 95% of theoretical. The dyestuff is soluble in water, ethyl alcohol, acetone and low molecular weight esters, such as ethyl acetate and butyl acetate, and dyes cellulose acetate or organic derivative of cellulose materials in a bright red-violet shade from such solvent dyebaths. The dyed materials are extremely fast to light and acid fading. No change in shade is observed after 50 hours' exposure in the "Fadeometer" and 16 hours' exposure to an acid atmosphere in accordance with the standard A. A. T. C. C. tests.

It is to be understood that the foregoing detailed description is given merely by way of illustration and that many variations may be made therein without departing from the spirit of our invention.

Having described our invention, what we desire to secure by Letters Patent is:

1. The anthrapyridone dyestuff of the following formula:

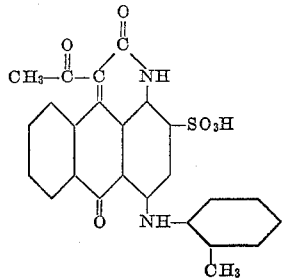

2. Process for the production of novel anthrapyridone dyestuffs, which comprises reacting ethyl-aceto-acetate at elevated temperature employing an alkaline condensing agent with a substituted amino-anthraquinone compound of the following formula:

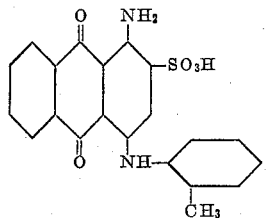

distilling the lower boiling reaction products from the reaction mixture during the reaction, and diluting the reaction mixture with benzene to precipitate the anthrapyridone dyestuff therefrom.

GEORGE W. SEYMOUR.
VICTOR S. SALVIN.
WILFORD DONALD JONES.

REFERENCES CITED

The following references are of record in the file of this patent:

UNITED STATES PATENTS

| Number | Name | Date |
|---|---|---|
| 1,398,357 | Briggs et al. | Nov. 29, 1921 |
| 1,783,607 | Dreyfus | Dec. 2, 1930 |
| 1,912,301 | Peter | May 30, 1933 |
| 2,029,007 | Weinand | Jan. 28, 1936 |
| 2,249,607 | Galatioto | July 15, 1941 |
| 2,359,673 | Peter | Oct. 3, 1944 |
| 2,377,145 | Gutzwiller | May 29, 1945 |

FOREIGN PATENTS

| Number | Country | Date |
|---|---|---|
| 603,241 | Germany | Sept. 26, 1934 |